(12) United States Patent
Simon et al.

(10) Patent No.: US 8,825,596 B2
(45) Date of Patent: Sep. 2, 2014

(54) SYSTEMS AND METHODS FOR ROBUST DATA SOURCE ACCESS

(71) Applicants: Eric Simon, Juvisy (FR); Francoise Fabret, Versailles (FR); Adrian Dragusanu, Garches (FR)

(72) Inventors: Eric Simon, Juvisy (FR); Francoise Fabret, Versailles (FR); Adrian Dragusanu, Garches (FR)

(73) Assignee: Business Objects Software Limited, Dublin (IE)

( * ) Notice: Subject to any disclaimer, the term of this patent is extended or adjusted under 35 U.S.C. 154(b) by 115 days.

(21) Appl. No.: 13/627,141

(22) Filed: Sep. 26, 2012

(65) Prior Publication Data
US 2014/0089254 A1    Mar. 27, 2014

(51) Int. Cl.
*G06F 17/30* (2006.01)

(52) U.S. Cl.
USPC ............ 707/609; 707/769; 707/E17.014; 707/E17.062

(58) Field of Classification Search
CPC ......... G06F 17/30864; G06F 17/30286; G06F 17/30457; G06F 17/30554; G06F 17/30669; G06F 8/20; G06F 9/4448; G06F 9/541; G06F 17/30923
See application file for complete search history.

(56) References Cited

U.S. PATENT DOCUMENTS

2006/0230017 A1* 10/2006 Larson et al. .............. 707/2
2012/0059839 A1*  3/2012 Andrade et al. .......... 707/760

* cited by examiner

*Primary Examiner* — Anteneh Girma
(74) *Attorney, Agent, or Firm* — Buckley, Maschoff & Talwalkar LLC

(57) ABSTRACT

A method for determining access to a data table store includes determining static properties of data sources during query design, loading the static properties into an unavailability table, at query execution evaluating dynamic properties of the data sources and updating the unavailability table, evaluating a preference expression by a table dispatcher component using session context information from the availability table, determining if a preferred table is available at query execution, and if available indicating to access the preferred table, else applying unavailability rules to obtain repair actions. The preference expression including a user-defined preference between an original table and its replica and user-defined repair actions, where a selection is made at query execution between an original data table and a replicated data table based on the unavailability rules. A non-transitory computer readable medium and a system for implementing the method are also disclosed.

19 Claims, 5 Drawing Sheets

SYSTEMS AND METHODS FOR ROBUST DATA SOURCE ACCESS

BACKGROUND

A federated database system is a type of database management system (DBMS) that can access independent database systems as a single database. These independent databases can be located remote from each other, and can be coupled via an electronic computer network. Because each individual database system can remain independent, the need to merge disparate database records into a single format before accessing the data is not necessary.

An Enterprise Information Integration (EII) system can enable the definition and querying of target schemas (also called data federation schemas), within a federated database system. The target schemas can be composed of target tables, over a set of distributed and heterogeneous data sources. These data sources can be operated inside or outside the enterprise.

An EII system is middleware that can include two types of components: data source wrappers and a query engine. The data source wrappers can expose metadata of the data sources in the form of relational schemas composed of source tables. The target tables that compose a target schema can be relational tables whose instances can be defined by relational database language queries that can reference source tables or previously defined target tables. A typical language for expressing target tables could be structured query language (SQL)—e.g., a "create view" statement of SQL. The query engine (QE) of an EII can provide a SQL interface to express multi-source queries that refer to source tables or target tables. At the time of execution, a multi-source query is first "unfolded" using the definitions of the target tables, and then decomposed into both a set of sub-queries that are processed by the wrappers, and an assembly query. The latter is processed by the QE using the results returned by the sub-queries. This decomposition of a multi-source query is called a query processing plan.

DETAILED DESCRIPTION

One or more systems and methods in accordance with an embodiment can provide a read-only replica of a data source (henceforth "replicated data source"). The data source can be part of a federated database system. The replicated data source can be created using data replication technology, for example, an extract-transform-load (ETL) tool. The ETL can replicate a data source's data into a destination system located inside an enterprise's computing network. Then, this replicated data source can be accessed by the enterprise's applications instead of the original data source from the federated database system. The replicated data source can be accessed to avoid contention with transactional applications, which may be loading down the federated data source, or at selected times (e.g., to avoid maintenance downtime on the federated data sources). The EII query tool can be extended with a table dispatcher agent that is configured to decide during the execution of a multi-source query whether to access a source table from the original data source or from its replicated data source.

The decision by the table dispatcher agent can be based on metadata that includes (1) user-defined semantics of preference between an original table and its replica; (2) static and dynamic knowledge of data source unavailability; and (3) user-defined repair actions to address data source unavailability. This metadata can be defined at design time except for the dynamic knowledge component of item 2, which can be computed at runtime.

In accordance with an embodiment, the metadata of items 1 and 3 can be expressed in a model at design time, along with a preference expression associated with a source table, and a table of unavailability rules for one or more data sources. A model to express static knowledge of data source unavailability for metadata item 2 can also be defined at design time. These metadata elements (items 1-3) extend the standard metadata of a data source typically managed by an EII system and are referred to as SMDextension (i.e., the metadata elements that extend a data source's standard metadata). A system in accordance with an embodiment can include a table dispatcher element that can process the three types of SMDextension metadata and decide which tables to access during the processing of a query.

Figure 1:
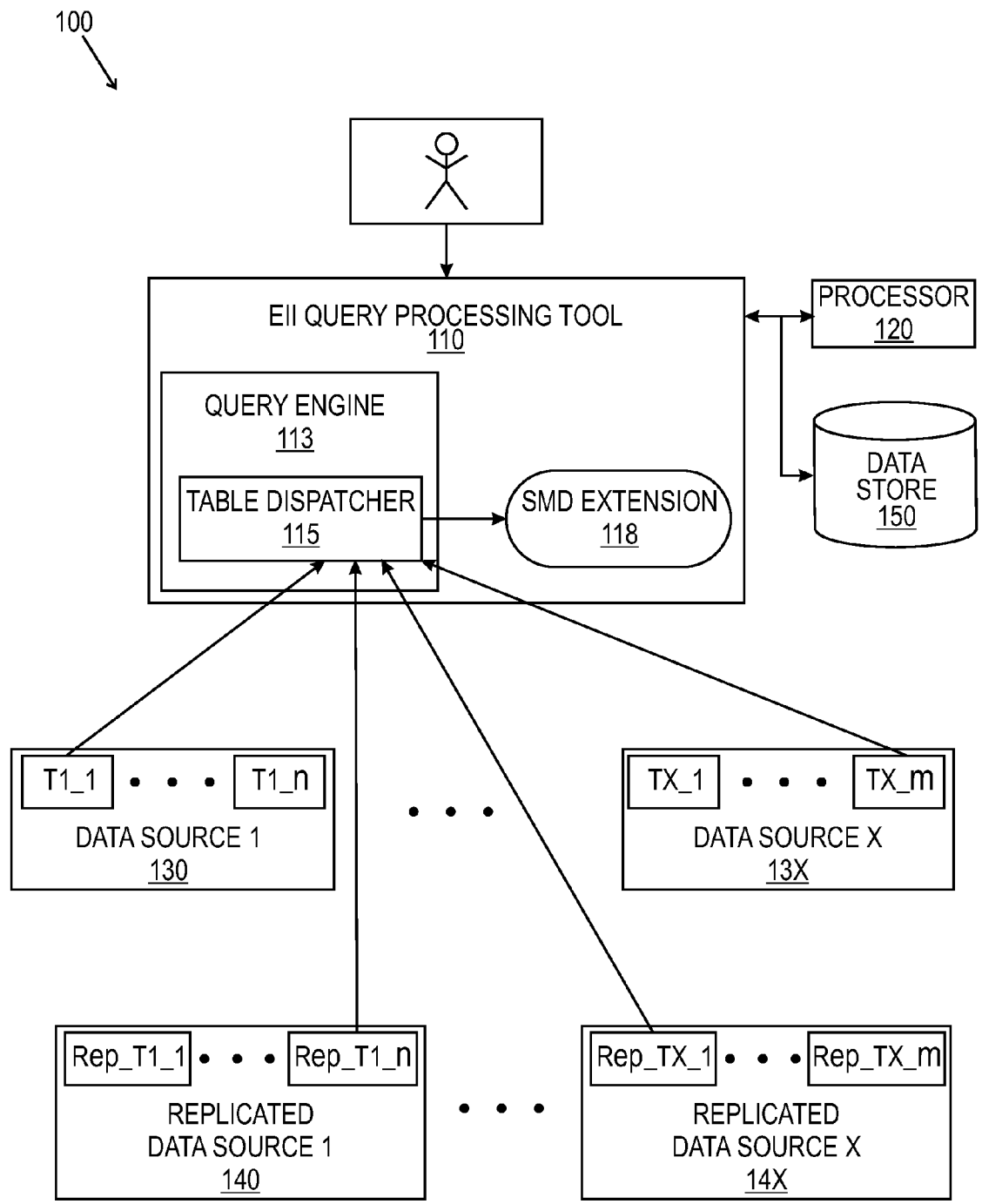
FIG. 1 depicts a system in accordance with an embodiment.

FIG. 1 depicts enterprise information integration system 100 in accordance with an embodiment. System 100 includes EII query tool 110 that can query target schemas. The EII query tool can include query engine 113, table dispatcher 115, and storage area 118 that can contain SMDextensions. The EII query tool can be controlled by processor 120, which can be located remotely, for example at a server connected to the EII query tool via an electronic communication network. Processor 120 can also be located local to the query tool. In one implementation, the EII query tool and its components can be implemented as components of processor 120. Dedicated hardware, software modules, and/or firmware can implement EII query tool 110 and its components.

Multiple data sources 130, 13X located in a federated database system can be accessed by query engine 113. Within each data source can be one or more data tables T1_1 . . . T1_n, Tx_1 . . . Tx_n. The data sources, and their tables, are replicated in replicated data sources 140, 14X. The replicated data sources and tables can be resident in data store 150. Data store 150 can be in communication with processor 120 and EII query tool 110 via the electronic communication network.

Figure 2:
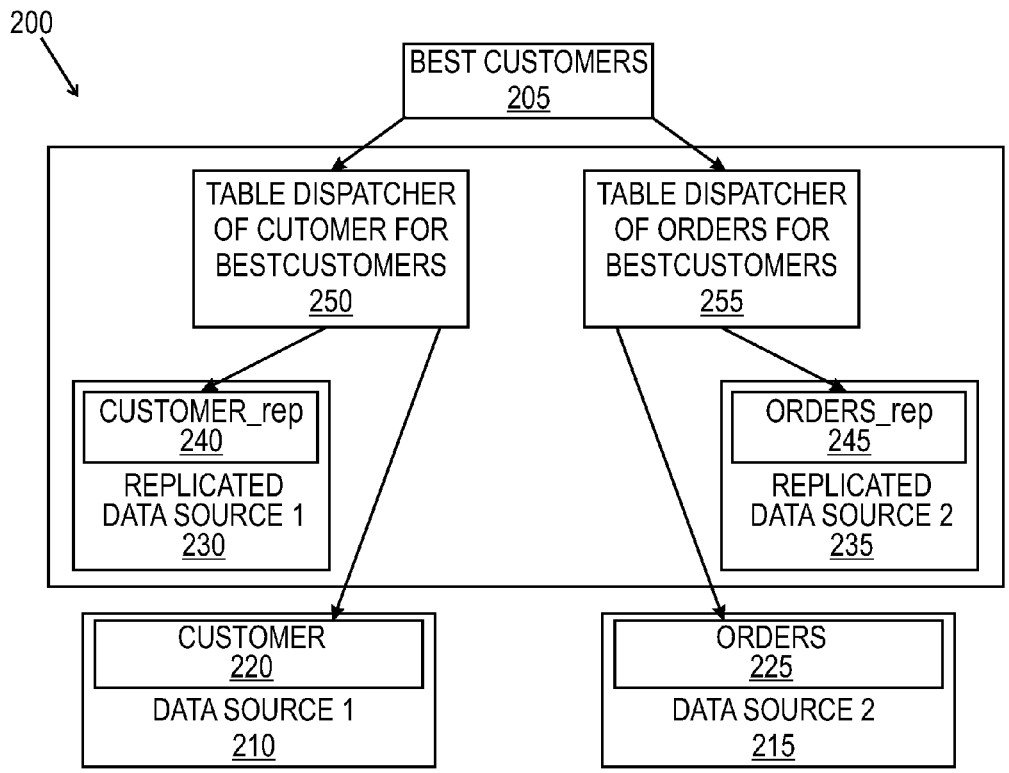
FIG. 2 depicts a data table structure in accordance with an embodiment.

FIG. 2 depicts data structure 200 in accordance with an embodiment. The data structure is implemented under control of processor 120. Portions of data structure 200 can be resident in disparate data stores located in federated data stores and other portions can be located in data store 150. By way of example, a marketing company can prepare a loyalty campaign meant to offer daily discounts to their top one-hundred customers. In order to implement the campaign, the marketing team might need to analyze data coming from two federated data sources 210, 215 that are accessible to EII query tool 110 via an electronic communication network. Federated data source 210 can contain customer database 220 that contains customer names and contact information; the other federated data source 215 can be linked to a transactional system and contains order database 225 which includes sales histories. At design time, a target table 205 named "BestCustomers" can be defined using the EII's design tool. This target table can combine data from customer table 220 in the first data source with data from orders table 225 in the second data source. The numbers of tables that can be combined into the target table are not limited, and two tables are chosen here for purposes of this discussion.

To better target loyal customers and to keep the campaign current, the marketing team could need to run reports on the "BestCustomers" table 205 at any time regardless of the availability of the two data sources 210, 215. Accordingly, robust access to the "BestCustomers" table is needed. To provide data tables that can be accessed independent of the availability of their resident data source, customer table 220 and orders table 225 can be replicated in replicated data sources 230, 235 containing replicated tables 240, 245 respectively. At query execution time, table dispatchers 250, 255 can choose between accessing original tables 220, 225 from their resident data sources 210, 215 and accessing respective replicated tables 240, 245 in replicated data sources 230, 235.

For the following discussion, if T is a source table (e.g., data sources 220, 225) of a data source S (e.g., data source 210, 215), the replica of T (e.g., replicated data tables 240, 245) in a replicated data source S' (replicated data sources 230, 235) is denoted as rep_T.

In accordance with an embodying method, at runtime for a given user session one or more session parameters can be evaluated. The values of the session parameter(s) can be either obtained from the user session or explicitly set in the user session.

Examples: the following are session parameter names:

Username: string that identifies a user,

Currenttime: timestamp that identifies the time at which a query is evaluated by the EII engine, Currentdate: date at which a query is evaluated by the EII engine Let TT be a target table then the user-defined semantics of a target table TT can be expressed by a set of preference expressions associated with the source tables T referenced by the definition of TT such that T has an associated replicated table rep_T.

A preference expression for a source table T can specify when the use of T could be preferred with respect to the use of its replica rep_T. In accordance with one implementation, a preference expression can be defined by a preference condition, or a preference lookup.

A session parameter (SP) predicate is a predicate of the form: <sp_name><comp><val>, where:

sp_name denotes a SP parameter name;

comp is a comparator among: =, >, <, >=, <=, in, between, etc.;

val is an atomic value, or a set of values, or an interval depending on the nature of the comparator;

Examples: using the SP names defined in the previous example, we can define the SP predicates:

username in ('BigBoss', 'MyBoss');

currenttime between '12:00:00' and '13:00:00';

A preference condition for a source table T is a logical expression built from SP predicates and the following logical connectors: AND, OR, NOT. Evaluation priorities can be expressed using parenthesis. The following is an example of a preference condition for table orders 220 defined using SP names: "username", "usergroup", "needLatestData":

(username in ('CEO', 'CTO') OR usergroup='poweruser') AND (needLatestData='true').

If the preference condition expression for table T evaluates to true then table T is chosen, otherwise table rep_T is chosen at execution.

A preference lookup for a source table T that has a replica rep_T can be defined as an association between a preferred table, and a session parameter context (or "context" for short), where the preferred table is either T or rep_T, and context is a set of SP values. This association can be conveniently represented using:

(1) A lookup table (see Table I) whose schema includes: a Preferred_table column and as many columns as there are SP names in the Context. In this schema, the SP columns represent a primary key, so there can be only one preferred table for a given tuple of values of SP names. Each row in the table associates a (preferred) table name with several SP values; or (2) A default table value for all cases that are not captured by the rows of the lookup table.

An example of preference lookup for source table orders 220 can be described by: (1) an association table between the SP "username" and a preferred table "Orders" or "rep_Orders", and (2) a default value that is "Orders".

TABLE I

| Username | Preferred_table |
|----------|-----------------|
| John     | Orders          |
| Peter    | rep_Orders      |
| Sonia    | rep_Orders      |
| David    | Orders          |

For a given source table T, a preference condition expressed by a preference lookup can be evaluated by a pattern matching query over the preference lookup in which each SP name of the preference lookup is instantiated with a specific value taken from the execution context of the user session. The result of the query can be a (single) preferred table name or an empty set. If the query returns an empty set then the default table name is used as the preferred table.

An unavailability rule can be applied to determine what happens if a preferred table (computed using a preference expression) cannot be used because it is unavailable at query runtime (e.g., connection returns an error, data source is overloaded). An unavailability rule can specify possible alternate choices including, but not limited to, using another table, returning an error, or executing the query by considering the unavailable table as empty. Systems and methods in accordance with an embodiment can express unavailability rules using a data structure referred to as a reparation table.

A reparation table RP is a table of schema (Table, Repair, Default) where Table and Repair are table names, and the attribute Default takes its value in {NULL, EMPTY}.

RP.Repair table represents the table name to be used as a "backup" table when RP.Table is unavailable.

RP.Default specifies the action to perform when Table is unavailable and Repair is not specified (NULL value), or Table and Repair are unavailable. Repair actions can include returning an error when there is a NULL value, or using an empty value for the instance of RP.Table when there is an EMPTY value.

Table II is an example of a reparation table for table orders 220.

TABLE II

| Table | Repair | Default |
| --- | --- | --- |
| Orders | rep_Orders | NULL |
| rep_Orders | NULL | NULL |

During execution of a query on target table "BestCustomers" 205, the following sequence can be implemented in accordance with an embodiment. Because the definition of table "BestCustomers" 205 involves table orders 220, and table orders has a replica table 240, the preference condition for table orders is evaluated. The reparation table (e.g., Table II) indicates that if table orders is the preferred table and it is unavailable, then table rep_Orders can be used instead. If rep_Orders is unavailable, then an error must be returned. Thus, when executed the query on "BestCustomers" will also return an error.

In order to apply unavailability rules for a given table at runtime the availability status of the data source that stores that table is determined. There can be at least two categories of data source properties that determine the status—e.g., static and dynamic properties.

These properties give the status (e.g., available, unavailable, overloaded) of a data source at any given time. Availability Dynamic Data Source (ADDS) properties can be evaluated at query execution time using specific methods implemented by the EII query tool or its components. Examples of such methods (and their call) include isAvailable (datasource), isOverloaded(datasource).

Availability Static Data Source (ASDS) properties describe the predicted status of a data source regarding its availability or workload. These ASDS properties can be expressed as a set of time intervals over a predefined time period (hours, day, week, month, year). Some examples of the ASDS properties include scheduled maintenance period, unavailability period, and overloading period. These periods can be predetermined based on operation of the federated database system that includes the data source, or on operation of the data source itself.

As described above, SMDextension 118 (FIG. 2), in the EII query tool can extend the standard metadata exposed by a data source to an EII query engine. The SMDextension exposes ASDS properties using unavailability tables.

Table III is an example of an unavailability table that summarizes the ASDS properties of a data source. The unavailability table can be multi-dimensional, but a two dimensional table is shown for discussion purposes. The unavailability table can include the following fields:

TableID: the unique identifier of the table(s) in the data source;
Sequence: ID of an unavailability pattern for a TableID;
Type: U for unavailable, O for overloaded;
Timeframe(periodic): H (hour), D (day), W (week), etc.;
Start: the start time for the unavailability/overloaded interval; and
End: the end time for the unavailability/overloaded interval.

TABLE III

| Table ID | sequence | type | timeframe | start | end |
| --- | --- | --- | --- | --- | --- |
| Orders | 1 | U | W | Monday | Monday |
| Orders | 2 | U | D | 0:00:00 | 01:30:00 |
| Orders | 3 | O | D | 12:00 | 13:30 |
| Orders | 4 | O | M | 1 | 3 |
| Orders | 5 | O | Y | 25/12 | 31/12 |

To determine the availability of table orders 220, first assume that the table is always available except at the time intervals specified by the above unavailability table. For example, the unavailability table indicates the table orders is not available (1) on Mondays; (2) every day between midnight and 1:30; (2) everyday from midday to 13:30; (4) the first three days of each month; and (4) from December 25th through December 31st.

An unavailability table can be loaded at design time or at execution time, or both. At design time, the table can be loaded, for example, with the predetermined maintenance schedule of the data source. At execution, a self-learning algorithm based on dynamic knowledge of the data source's state can obtain data for the unavailability table.

At execution time, table dispatcher 115 within query engine 113 can perform a table dispatcher algorithm. Input to the algorithm can include a table reference T, and a reference to its replica rep_T; and session_context information—e.g., a set of (<SP parameter, value>) pairs. Also known by the algorithm are the preference expressions for both T and rep_t; the unavailability rules for T and rep_T; and the reparation table RP.

The table dispatcher algorithm provides a decision regarding accessing the table—i.e., a table reference, an error, or an empty table. The algorithm evaluates the user-defined preference expression for T and rep_T using the session_context information.

For example, let pref_T be the preferred table returned by the preference expression. The algorithm evaluates the availability status of pref_T given the current time using the static status knowledge for pref_T—i.e. query the unavailability table for pref_T. If pref_T is unavailable with respect to the static knowledge then the availability status of pref_T is unavailable. Else the availability status of pref_T is given by its dynamic status.

Case 1: pref_T is available then return pref_T; or
Case 2: pref_T is unavailable Use the unavailability rules in order to obtain the repair action specified by the reparation table RP. For example, let t be the tuple of RP where t.Table=Pref_T.

Case 2.1: t.Repair=NULL, then pref_T has no backup table, return t.Default

Case 2.2: t.Repair is a table name, say T', then evaluate the availability of T'. If T' is available then return T', else return t.Default.

Figure 3:
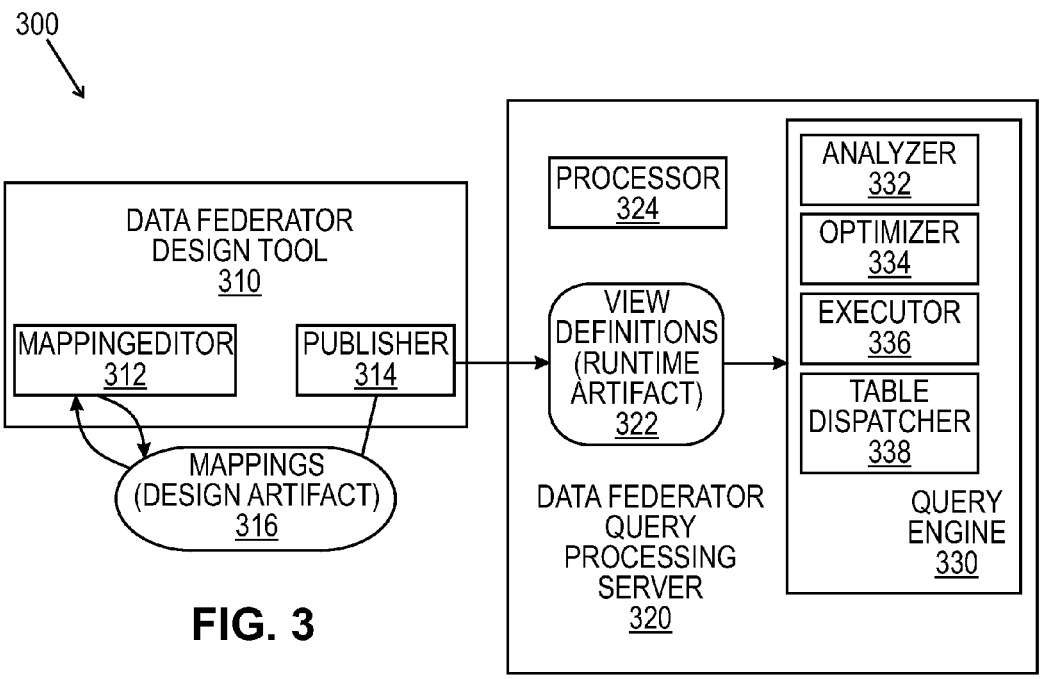
FIG. 3 depicts a system in accordance with an embodiment.

FIG. 3 depicts federated data system 300 in accordance with an embodiment. System 300 includes design tool 310 in communication with processing server 320. Both the design tool and the processing server can be controlled by a processor (e.g., processor 324). This processor need not be located locally in processing server 320, but can be located remotely—e.g., processor 120 (FIG. 1). Design tool 310 can include mapping editor 312 and publisher 314. Both mapping editor 312 and publisher 314 are in communication with mappings store 316.

Target tables that are to be queried are defined using mapping rules. The mapping rules can be stored in a data store (e.g., data store 150) and accessed by the mapping editor. Once the mapping editor has fully defined the target tables they may be stored in the mappings store. Publisher 314 compiles the mappings into SQL functions that can be stored in the view definitions store 322, which in one implementation can be located in the processing server.

In addition to the view definitions store, processing server 320 can include processor 325 and query engine 330. The query engine is a runtime component that can execute the view definitions. Query engine 330 can include Analyzer 332 (parsing, syntactic and semantic check), Optimizer 334 (optimized the queries), Executor 336 (executes the query once optimized) and table dispatcher 338 (describe above).

At design time, the preference expression (described above) can be implemented by system 300 with an impact on the target table definitions of the mapping editor. For example, given a source table T, rep_T its replica and TT the target table that uses T in its definition, the preference expression is implemented by replacing all the references of T in the context of TT by a new mapping M that defines an intermediate target table T' that has the same schema as T.

Figure 4:
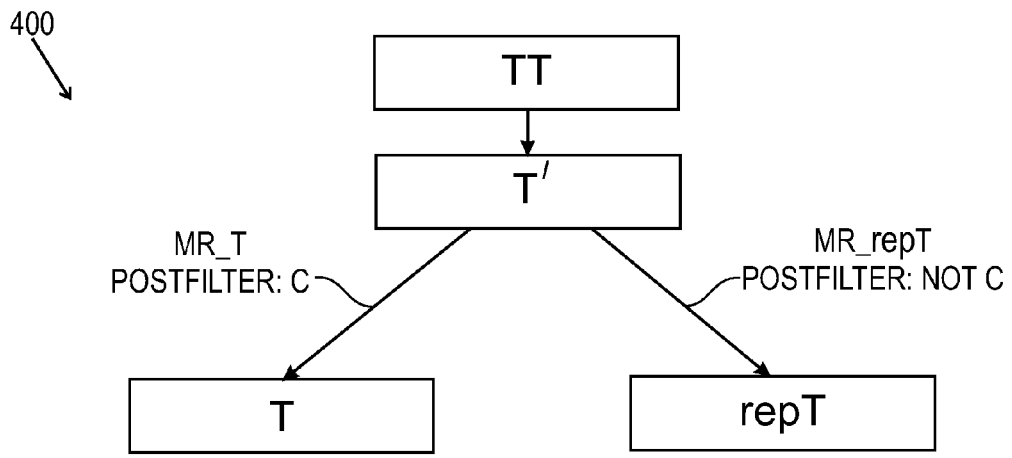
FIG. 4 depicts a target table definition structure in accordance with an embodiment.

FIG. 4 depicts a target table definition structure in accordance with an embodiment. In a simple case, target table TT would use table T in a simple mapping rule. If the preference expression for T is a preference condition C, the new mapping M will consist of two mapping rules MR_T and MR_rep_T, with a direct 1:1 mapping to T and rep_T, respectively. If T is preferred over rep_T, MR_T will have a postfilter=C and MR_rep_T=not C, otherwise the postfilter for MR_rep_T is C and the postfilter for MR_T is (not C).

Figure 5:
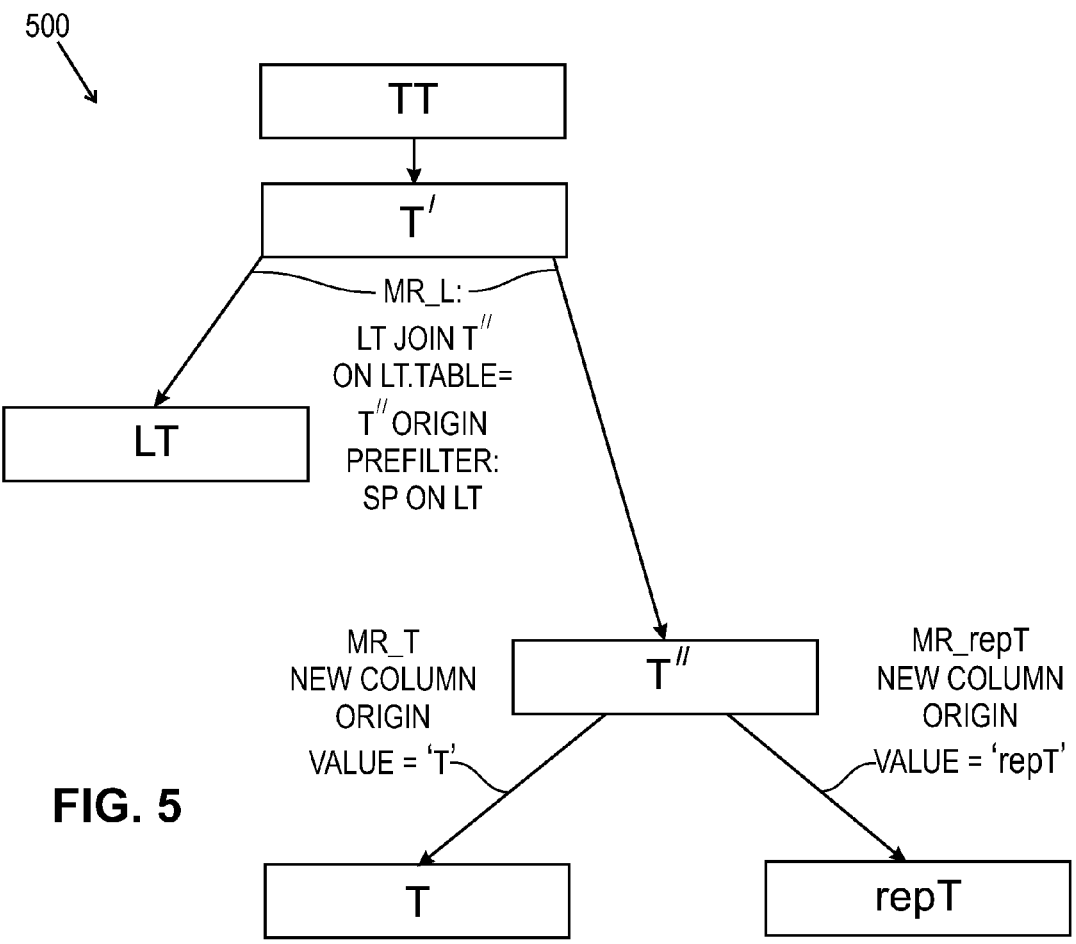
FIG. 5 depicts a target table definition structure in accordance with an embodiment.

FIG. 5 depicts another target table definition structure in accordance with an embodiment. If the preference expression for T is a lookup expression, then the construction of the new mapping M is as follows. Let T" be an intermediate target table having an additional column named "origin". The mapping for T" has two mapping rules:

MR_T: 1:1 mapping for the columns of T, while the "origin" column is mapped to constant 'T'; and MR_T_rep: 1:1 mapping for the column of T, while the "origin" column is mapped to constant 'repT'.

The mapping of T' has a single mapping rule MR that joins lookup table LT with the previously defined T" table. Recall that the schema of LT has a column for each SP name involved in the preference lookup plus a column named "Preferred_table". Thus, the join condition of the MR mapping rule will be LT.preferred_table=T".origin. MR can contain a pre-filter for each column corresponding to SP, e.g., username=$username.

The unavailability rules described above can be implemented as metadata in the corresponding data sources. This can have an impact on the preference expressions and the runtime execution of queries.

Given a query Q over a set S of tables, each one of them having at most one replica:

1) During static analysis period, the status (e.g., available, unavailable, overloaded) of each such table (given the status its data source) is known and can be applied to the algorithm previously described.
   a) If T cannot be used, the unavailability rule is used to make a decision:
      i) If T can be replaced by another table (that is available), do it for all its references in the query (use reparation_table);
      ii) If T can be executed as if it were empty, add an empty table for all its references; or
      iii) In case of an error, the query cannot be executed, return an error.

2) At optimizing period (e.g., during query processing) dynamic conditions are evaluated:
   a) Preference condition: simplify the union by evaluating the conditions (as conditions are exclusive, one and only one branch will be chosen);
   b) Preference lookup:
      i) Evaluate the lookup table so a branch of the union can be selected.
3) There is no impact on execution.

Figure 6A:
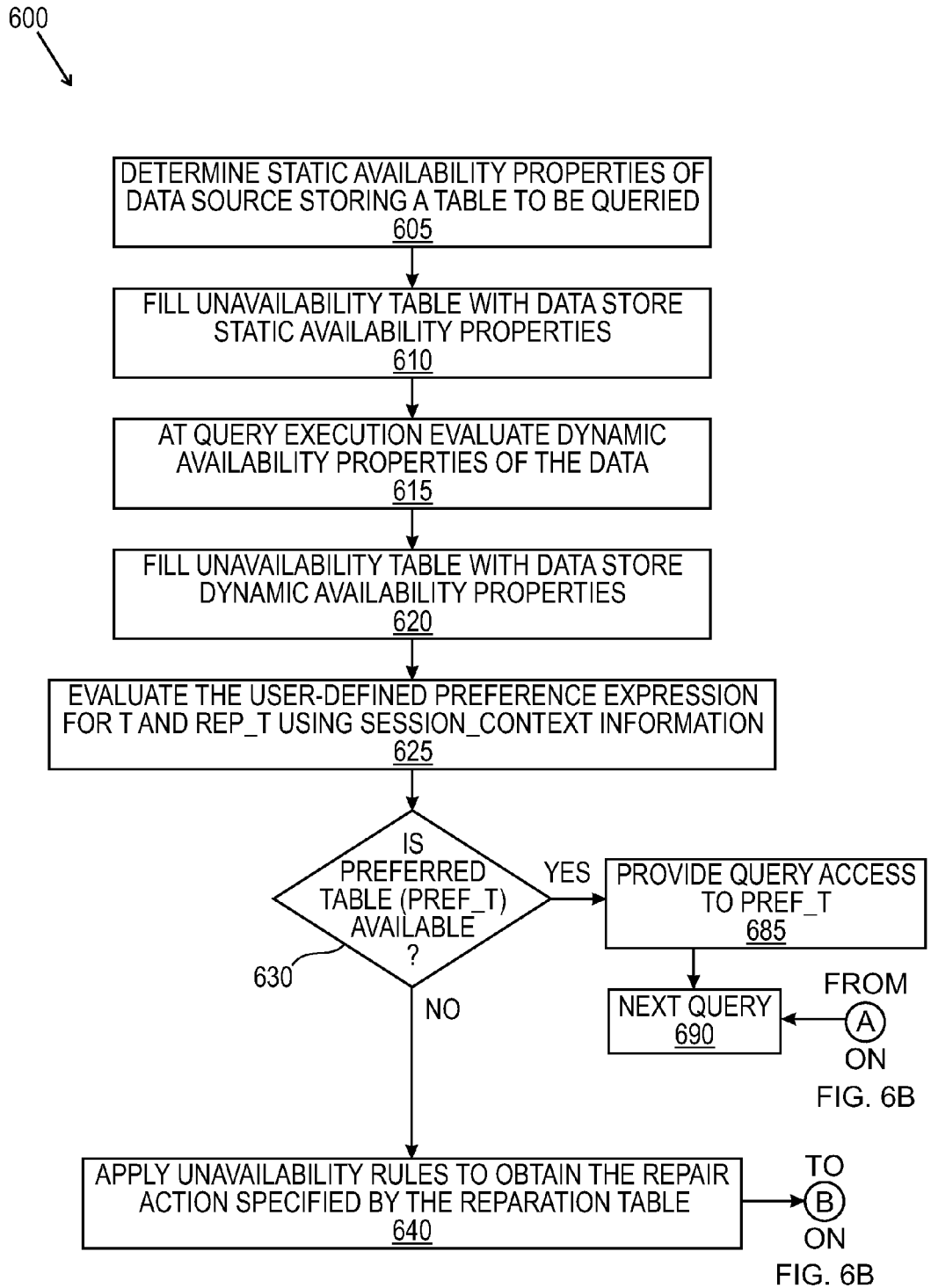
FIGS. 6A-6B depict a process in accordance with an embodiment.
Figure 6B:
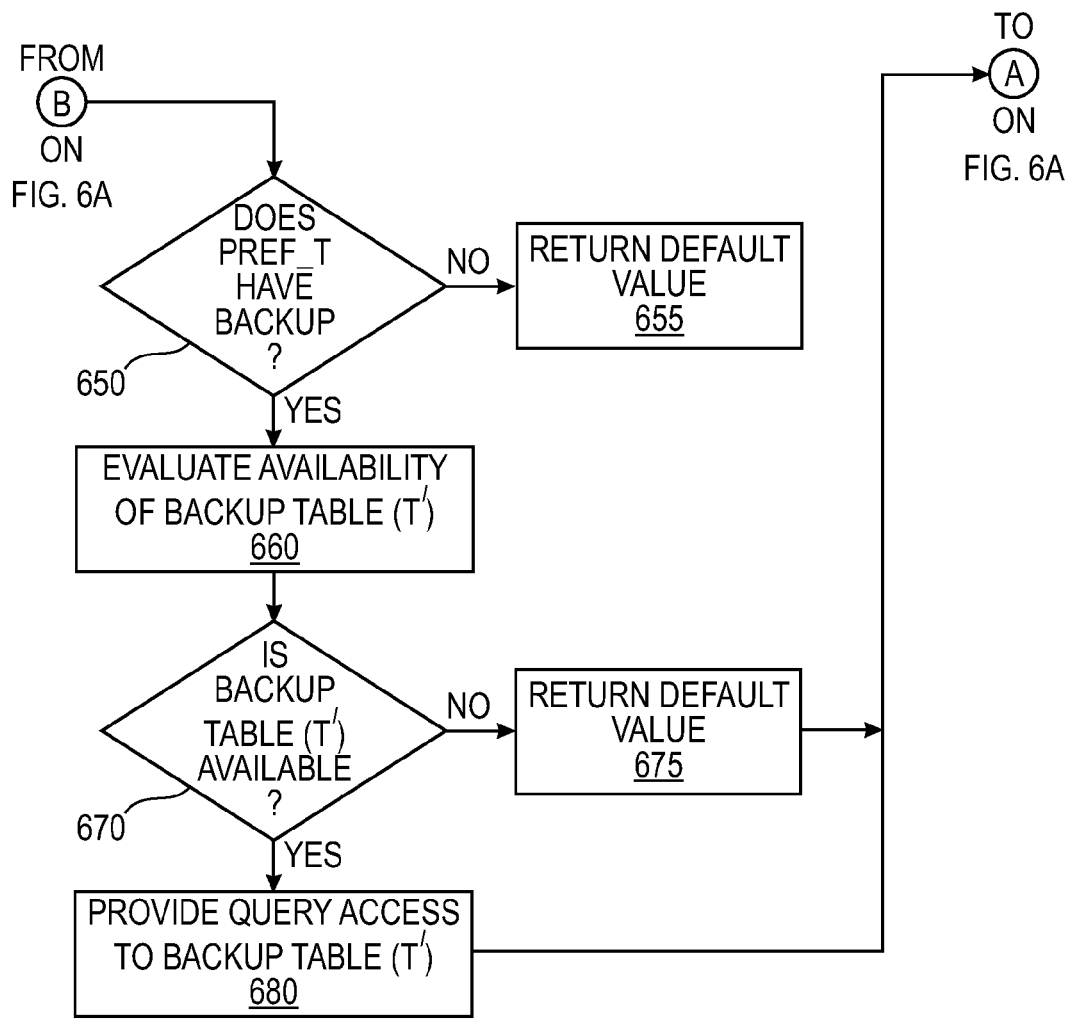

FIGS. 6A-6B depict process 600 for determining table availability during the execution of a multi-source query in accordance with an embodiment. Process 600 can determine whether to access a source table from the original data source or from its replicated data source. During the design phase of query a processor can implement process 600 and determine static properties of data source(s) to be queried, step 605. Such static properties can include, but are not limited to, predictors of the data source status regarding availability and/or workload. These static properties can be loaded into an unavailability table, step 610.

At execution of the query, the dynamic properties of the data source(s) can be evaluated, step 615, by one or more components of the EII query tool. Dynamic properties can include, but are not limited to, data source status real time status (e.g., unavailable, available, overloaded). The unavailability table can be updated to include the dynamic properties, step 620.

A user-defined preference expression, which can include a preference condition and/or a preference lookup, is evaluated, step 625, by a table dispatcher using session_context information. The preference expression determines whether table T or its replica, rep_T, is the preferred table at query execution. A decision, step 630, is made as to whether the preferred table is available at query execution based on contents of reparation table and application of unavailability rules from the unavailability table.

If the preferred table, pref_T, is available the table dispatcher component indicates to the EII query engine to access pref_T, step 685. After execution of the query, process 600 continues on to the next query, step 690, to begin again.

If pref_T is not available, unavailability rules are applied, step 640, to obtain repair action(s) specified in a reparation table. The reparation table can include schema (table, repair, default) that instructs the table dispatcher in determining how to proceed during execution of the query. If the reparation table specifies, step 650, that pref_T has a backup table, process 600 continues to step 660. Else, process 600 continues to step 655 if there is not backup table for pref_T. A default value is then returned to the table dispatcher.

At step 660, the availability of backup table T' is evaluated. If the backup table is not available, a default value is then returned to the table dispatcher, step 675. In one implementation there can be more back up tables included in the design (i.e., T', T", etc.), but for purposes of this description only one back up table is included in the design. If the backup table T' is available, the table dispatcher component indicates to the EII query engine to access backup table T', step 680. After execution of the query, process 600 continues on to the next query, step 690, to begin again.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as a method for deciding during the execution of a multi-source query whether to access a source table from the original data source or from its replicated data source.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for determining access to a data table stored in a data source, the method comprising:
   determining, by a processor, static properties of one or more data sources during a design phase of a query;
   loading the static properties into an unavailability table in a data store coupled to the processor;
   evaluating, at execution of the query, dynamic properties of the one or more data sources by an enterprise information integration component under control of the processor;
   updating the unavailability table to include the dynamic properties of the one or more data sources;
   evaluating a preference expression by a table dispatcher component using session context information from the availability table;
   determining if a preferred table is available at query execution based on the results of the preference expression;
   if the preferred table is available, the table dispatcher component indicating to a query engine to access the preferred table; and
   if the preferred table is unavailable, the table dispatcher component applying unavailability rules to obtain repair actions.

2. The method of claim 1, wherein the repair actions are specified in a reparation table that includes schema to instruct the table dispatcher component.

3. The method of claim 1, wherein the static properties include at least one of predetermined maintenance schedules and workload predictors for the one or more data sources.

4. The method of claim 1, wherein the preference expression is defined by at least one of a preference condition and a preference lookup.

5. The method of claim 1, further including the step of expressing at least one of user-defined preference between an original table and its replica and user-defined repair actions in the preference expression.

6. The method of claim 1, further including the step of selecting, by the table dispatcher at query execution, between an original data table located in an original data source and a replicated data table located in an a replicated data source based on the application of the unavailability rules.

7. The method of claim 6, specifying in the preference expression when the use of the original data table is preferred over the use of the replicated data table.

8. The method of claim 2, further including the steps of:
   the table dispatcher evaluating a backup table specified in the reparation table; and
   if the backup table is available, the table dispatcher component indicating to the query engine to access the backup table.

9. The method of claim 8, further including the step of if the backup table is unavailable, the table dispatcher component returning a default value to the query engine.

10. A non-transitory computer readable medium having stored thereon instructions which when executed by a processor cause the processor to perform the method of:
    determining, by a processor, static properties of one or more data sources during a design phase of a query;
    loading the static properties into an unavailability table in a data store coupled to the processor;
    evaluating, at execution of the query, dynamic properties of the one or more data sources by an enterprise information integration component under control of the processor;
    updating the unavailability table to include the dynamic properties of the one or more data sources;
    evaluating a preference expression by a table dispatcher component using session context information from the availability table;
    determining if a preferred table is available at query execution based on the results of the preference expression;
    if the preferred table is available, the table dispatcher component indicating to a query engine to access the preferred table; and
    if the preferred table is unavailable, the table dispatcher component applying unavailability rules to obtain repair actions.

11. The computer readable medium of claim 10, further including executable instructions to cause a processor to perform the steps of:
    evaluating a backup table specified in the reparation table; and
    if the backup table is available, the table dispatcher component indicating to the query engine to access the backup table.

12. The computer readable medium of claim 11, further including executable instructions to cause a processor to perform the step of returning a default value from the table dispatcher component to the query engine if the backup table is unavailable.

13. The computer readable medium of claim 10, further including executable instructions to cause a processor to perform the step of expressing at least one of user-defined preference between an original table and its replica and user-defined repair actions in the preference expression.

14. The computer readable medium of claim 13, further including executable instructions to cause a processor to perform the step of selecting, by the table dispatcher at query execution, between an original data table located in an original data source and a replicated data table located in an a replicated data source based on the application of the unavailability rules.

15. The computer readable medium of claim 14, further including executable instructions to cause a processor to perform the step of specifying in the preference expression when the use of the original data table is preferred over the use of the replicated data table.

16. A system comprising:
a processor configured to control an enterprise information integration system, the enterprise information integration system including:
a query engine having access to one or more data sources, the data sources coupled to the enterprise information integration system by an electronic communication network, wherein the one or more data sources each contain at least one original data table;
a data store coupled to the processor and the enterprise information integration system, wherein the one or more data sources and the original data table can be replicated in the data store;
a mapping editor configured to access mapping rules to define mappings of target tables for a query;
a query engine configured to execute view definitions of the mappings; and
a table dispatcher component configured to evaluate availability of a preferred table based on preference expressions and session context information, and configured to apply unavailability rules to obtain repair actions, wherein the repair actions are specified in a reparation table that includes schema to instruct the table dispatcher component.

17. The system of claim 16, further including:
a publisher component configured to compile the mappings into standard query language functions; and
a view definition component configured to store the complied functions.

18. The system of claim 16, further including the table dispatcher component configured to indicate to the query engine to access the preferred table if the evaluation determines the preferred table is available.

19. The system of claim 16, further including the table dispatcher configured to select, at query execution, between an original data table located in an original data source and a replicated data table located in an a replicated data source based on the application of unavailability rules.

* * * * *